(12) United States Patent
Albesiano et al.

(10) Patent No.: US 11,719,336 B2
(45) Date of Patent: Aug. 8, 2023

(54) GEAR SHIFT OF A SADDLE VEHICLE AND VEHICLE COMPRISING THIS GEAR SHIFT

(71) Applicant: PIAGGIO & C. S.P.A., Pontedera (IT)

(72) Inventors: Romano Albesiano, Pontedera (IT); Walter Scattolin, Pontedera (IT)

(73) Assignee: PIAGGIO & C. S P A., Pontedera (IT)

( * ) Notice: Subject to any disclaimer, the term of this patent is extended or adjusted under 35 U.S.C. 154(b) by 20 days.

(21) Appl. No.: 17/441,368

(22) PCT Filed: Mar. 13, 2020

(86) PCT No.: PCT/IB2020/052290
§ 371 (c)(1),
(2) Date: Sep. 21, 2021

(87) PCT Pub. No.: WO2020/194108
PCT Pub. Date: Oct. 1, 2020

(65) Prior Publication Data
US 2022/0252156 A1    Aug. 11, 2022

(30) Foreign Application Priority Data

Mar. 22, 2019    (IT) .......................... 102019000004213

(51) Int. Cl.
*F16H 63/18* (2006.01)
*B62M 25/06* (2006.01)
(Continued)

(52) U.S. Cl.
CPC ............. *F16H 63/18* (2013.01); *B62M 25/06* (2013.01); *F16H 59/70* (2013.01); *F16H 61/18* (2013.01);
(Continued)

(58) Field of Classification Search
CPC .......... F16H 63/18; F16H 61/16; F16H 59/70; F16H 61/18; F16H 63/36; F16H 59/68;
(Continued)

(56) References Cited

U.S. PATENT DOCUMENTS 4,455,884 A * 6/1984 Tsuruta ................... F16H 63/18
74/473.28
4,624,350 A * 11/1986 Akashi ..................... F16H 61/18
192/220

(Continued)

FOREIGN PATENT DOCUMENTS

EP    2 042 782 A    4/2009
JP    2014 199104 A    10/2014

*Primary Examiner* — Victor L Macarthur
(74) *Attorney, Agent, or Firm* — McGlew and Tuttle, P.C.

(57) ABSTRACT

A gear shift (100) is described for a saddle vehicle (M) comprising a shift lever (110), a selecting element (130) actuated through the shift lever (110) and a selector drum (150) connected to the selecting element (130) and adapted to engage gears. The gear shift (100) further comprises a block device (140) functionally connected to the selector drum (150) and configured so as to be switched between: a first configuration, wherein the block device (140) allows engaging a first gear (I) from a neutral gear (N) in a first change direction (Up), a second configuration, wherein the block device (140) inhibits the subsequent engagement of the neutral gear (N) from the first gear (I) in a second change direction (Dwn). Control means (120) of the block device (140) are further provided, actuated by a rider (G) so as to define a third configuration, wherein the block device (140) is disabled in order to allow engaging the neutral gear (N) from the first gear (I) in the second change direction (Dwn).

9 Claims, 8 Drawing Sheets

(51) Int. Cl.
*F16H 59/70* (2006.01)
*F16H 61/18* (2006.01)
*F16H 63/36* (2006.01)
*B62M 25/00* (2006.01)

(52) U.S. Cl.
CPC .......... *F16H 63/36* (2013.01); *B60Y 2200/12* (2013.01); *B62M 2025/006* (2013.01)

(58) Field of Classification Search
CPC ............ B62M 25/06; B62M 2025/006; B60Y 2200/12; B62K 11/04
See application file for complete search history.

(56) References Cited

U.S. PATENT DOCUMENTS

| | | | | |
|---|---|---|---|---|
| 4,631,984 | A * | 12/1986 | Jones | ...................... F16H 61/22 |
| | | | | 74/473.23 |
| 6,487,927 | B1 * | 12/2002 | Sputhe | ...................... G05G 5/05 |
| | | | | 74/473.23 |
| 7,854,178 | B2 * | 12/2010 | Takano | ................... F16H 61/18 |
| | | | | 74/337.5 |
| 8,201,470 | B2 | 6/2012 | Kosugi | |
| 8,276,472 | B2 * | 10/2012 | Sotani | ..................... F16H 63/18 |
| | | | | 74/337.5 |

* cited by examiner

GEAR SHIFT OF A SADDLE VEHICLE AND VEHICLE COMPRISING THIS GEAR SHIFT

TECHNICAL FIELD

The present invention relates to a gear shift of a saddle vehicle.

The present invention also relates to a saddle vehicle, especially a motorcycle with two or more wheels, equipped with this gear shift.

STATE OF THE ART

As it is well known, a gear shift of a saddle vehicle allows changing the gear ratio by engaging various gears.

A gear shift usually comprises a shift lever controlling a selecting element through a ratchet gear. The selecting element is star-shaped and defines number and sequence of the gears.

In a saddle vehicle, gears are usually arranged so that the first gear is engaged by pushing the shift lever downwards, i.e. towards the ground. The subsequent gears, i.e. from the second and above, are engaged by moving the shift lever reversely, i.e. upwards.

In motorbike racings, motor vehicles are usually equipped with the so-called "reverse shift", wherein gears work in the reverse order, i.e. the first gear is engaged upwards, and the subsequent gears are engaged downwards.

Both in road and race shifts, the neutral gear is between the first gear and the second gear.

Therefore, when changing up gears, switching from the first gear to the second gear, the neutral gear could be engaged by accident.

This is especially undesired in performance motorbikes, i.e. motorbikes used for races. In fact, in general, at high speeds the undesired engaging of the neutral gear while changing gears could result in motorbike unbalancing, especially when entering a turn or driving along it.

A device for preventing engagement of the neutral gear is disclosed in JP201419104. This known device is particularly complex.

A need therefore exist, to solve the drawbacks and the limits of the prior art described above.

SUMMARY OF THE INVENTION

The object of the invention is to provide a gear shift of a saddle vehicle, which allows to avoid accidental and undesired engagement of the neutral gear and which is simpler and more reliable than the prior art shifts.

A further object of the invention is to provide a saddle vehicle comprising this gear shift and achieving the same results.

This need is met through the gear shift of claim 1 and the saddle vehicle of claim 10.

In particular, the gear shift comprises a shift lever, a selecting element actuated through the shift lever, and a selector drum connected to the selecting element and adapted to engage gears.

The gear shift further comprises a block device functionally connected to the selector drum and configured so as to be switched between:

a first configuration, wherein the block device allows engaging a first gear from a neutral gear in a first change direction, and a second configuration, wherein it inhibits the subsequent engagement of the neutral gear from the first gear in a second change direction.

Control means of the block device are also provided, remotely actuated by a rider, for example a control on the handlebar; when actuated, the control means define a third configuration, wherein the block device is disabled in order to allow engaging the neutral gear from the first gear in the second change direction.

In a preferred embodiment, the selecting element is so configured as to provide for a changing up of gears starting from the neutral gear N to the gear N+1 above by actuating the shift lever 110 in a single first change direction Up, and for a changing down of gears starting from the gear N+1 above to the neutral gear N in a single second change direction Dwn opposite to the first change direction.

According to the present invention, through the block device and the control means, the gear shift can block the neutral gear when the vehicle is moving, i.e. once the rider has engaged the first gear. In this way, during the subsequent changing down of the gears, the block device inhibits the engaging of the neutral gear creating an abutment contrasting the rotation of the selector drum, as described in detail below. In other words, it defines a stop for the drum rotation; therefore, even by acting on the shift lever, this latter is blocked.

Moreover, the block device allows engaging autonomously the first gear from the neutral gear. The rider, with the vehicle still and the neutral gear engaged, can therefore normally control the shift lever to engage the first gear. Once the gear has been engaged, the block device automatically stops, inhibiting the neutral gear from being engaged again.

In order to engage again the neutral gear from the condition described right above, the rider shall act on the control means disabling the block device. Then, the rider can act on the shift lever and engage the neutral gear again. Once the control means have been released, the initial position of the block device in the neutral gear is configured again.

In particular, the block device comprises a stop element mounted integral with the selector drum and a block element co-acting with the stop element. The block element is adapted to switch from the first configuration, wherein the block element is fastened to the stop element allowing the rotation in the first change direction to engage the first gear from the neutral gear. In the second configuration, the block element is enabled and contrasts the stop element in engaging again the neutral gear from the first gear in the second change direction. Moreover, in the third configuration the block element is spaced from the stop element by the control means, to engage again the neutral gear from the first gear.

According to what described above, the stop element is a bushing comprising a tooth-shaped portion. The bushing is inserted on the shaft of the selector drum and has a radially projecting protuberance defining the tooth-shaped portion.

In particular, the block element is mounted rotatable around a rotation axis (X-X) and comprises a first elastic element so as to take:

the first configuration, wherein the block element is fastened to the tooth-shaped portion, corresponding to the neutral gear, allowing the selector drum to rotate in the first change direction (Up) to engage the first gear (I) and the subsequent gears;

the second configuration, wherein the block element is adjacent to, and contacting, the tooth-shaped portion, corresponding to the first gear (I), preventing the neutral gear (N) from being engaged again from the first gear in the second change direction (Dwn).

Therefore, the block element is kept in contact with the stop element through the elastic element, or return element.

In the third configuration, the block element is spaced from the tooth-shaped portion through control means contrasting the elastic return force, allowing the selector drum to rotate in the second change direction (Dwn) to engage again the neutral gear (N) from the first gear (I) and to return to the first configuration.

In particular, the control means comprise an actuating element, controlled by a rider, and connecting means between the actuating element and the block element.

In an embodiment, the actuating element is a lever controlling the pull of a cable, directly or indirectly connected to the block element. In particular, the lever is provided on the handlebar of the saddle vehicle.

Alternatively, a button can be provided transmitting an actuation signal to an actuator controlling the block element.

In a preferred embodiment, a control element is provided, actuated through the connecting means and connected to the block element. In this way, the block element is indirectly controlled through the control element. The control element is so configured as to move the block element between the second configuration, where it is enabled on the stop element, and the third configuration, where it is spaced from the stop element to return to the first configuration.

In a preferred embodiment, the control element is rotatably connected to the block element coaxially with the rotation axis of the block element. The first elastic element connects the control element and the block element, and is so arranged as to generate an elastic force pushing the block element against the stop element, keeping it in position.

In particular, the control element comprises an abutment portion, to which the block element is fastened through the first elastic element. The abutment portion is adapted to draw the block element to the third configuration when the control means are actuated.

The control element comprises a second elastic element, in particular a torsional spring adapted to bring again the control element into position. The block element is brought again into position through the first elastic element.

BRIEF DESCRIPTION OF THE DRAWINGS

Further characteristics and advantages of the invention will be more apparent from the description below of some preferred non-limiting embodiments, wherein.

In the various embodiments described below, the same elements, or parts of elements, are indicated with the same reference numbers.

DETAILED DESCRIPTION

Figure 1:
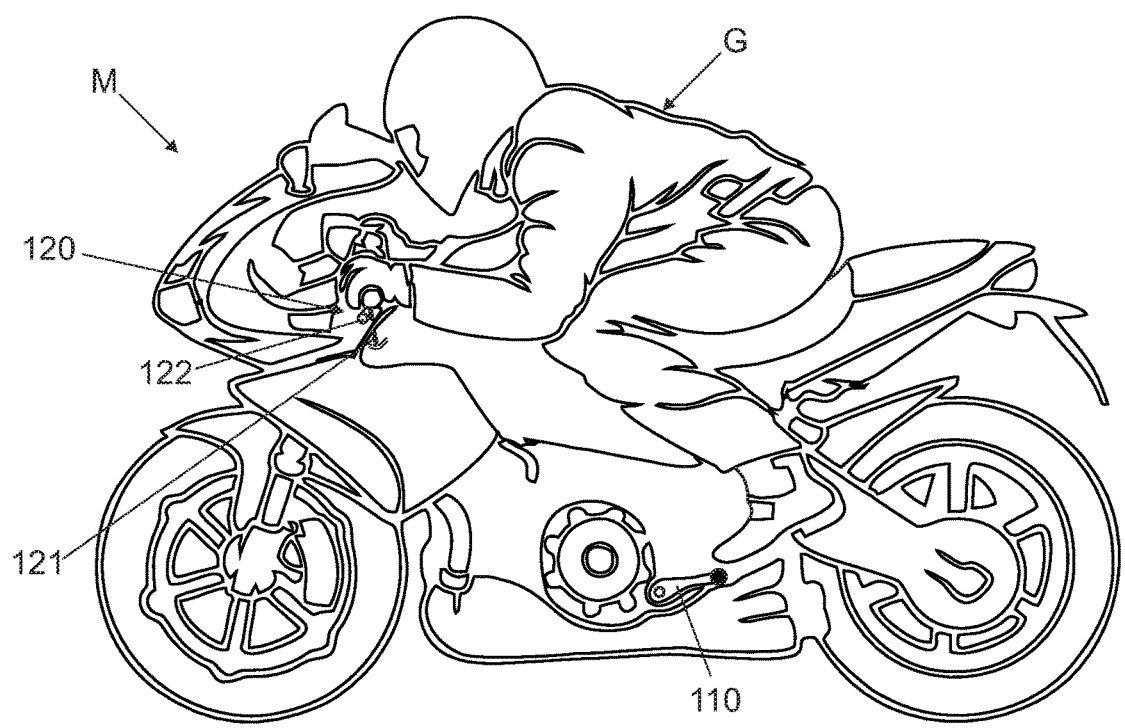
FIG. 1 is a side view of a saddle vehicle, in particular a two-wheel vehicle, i.e. a two-wheel motorbike, equipped with the gear shift of the invention.
Figure 2:
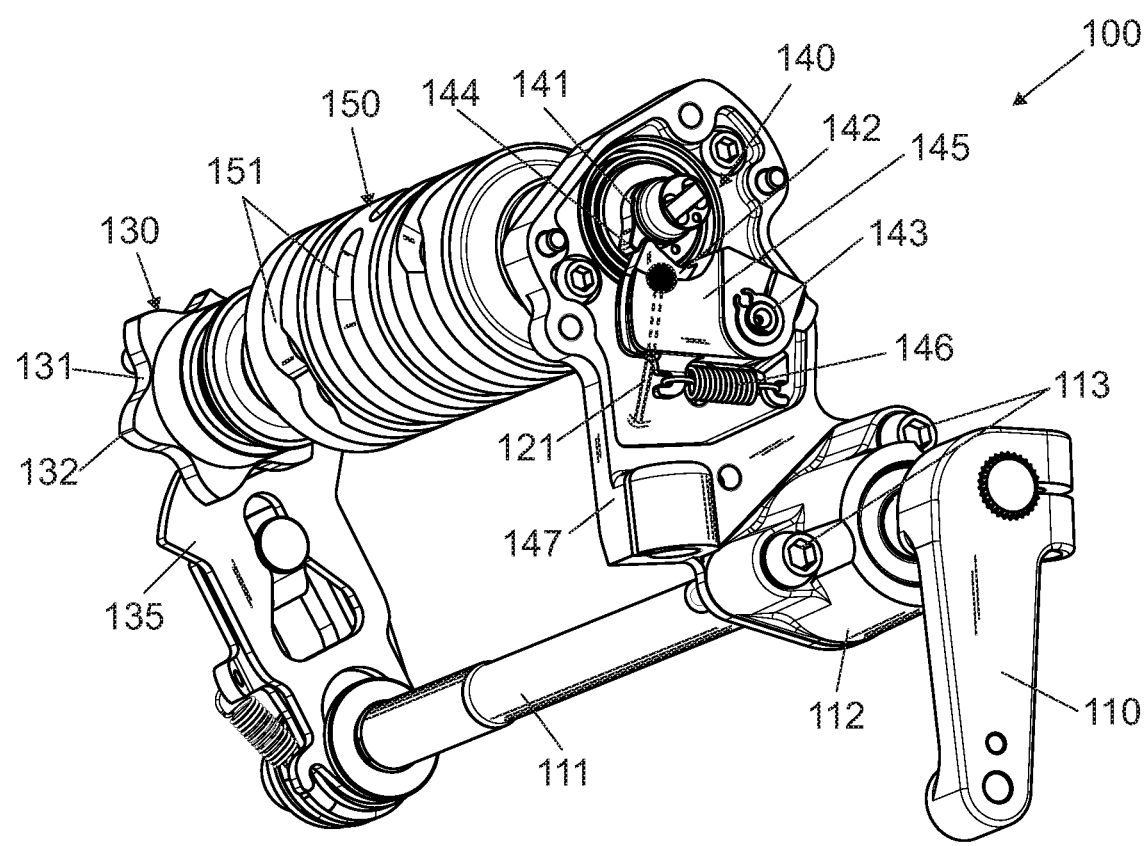
FIG. 2 is a perspective view of the gear shift of the invention provided with a block device of the neutral gear.
Figure 3:
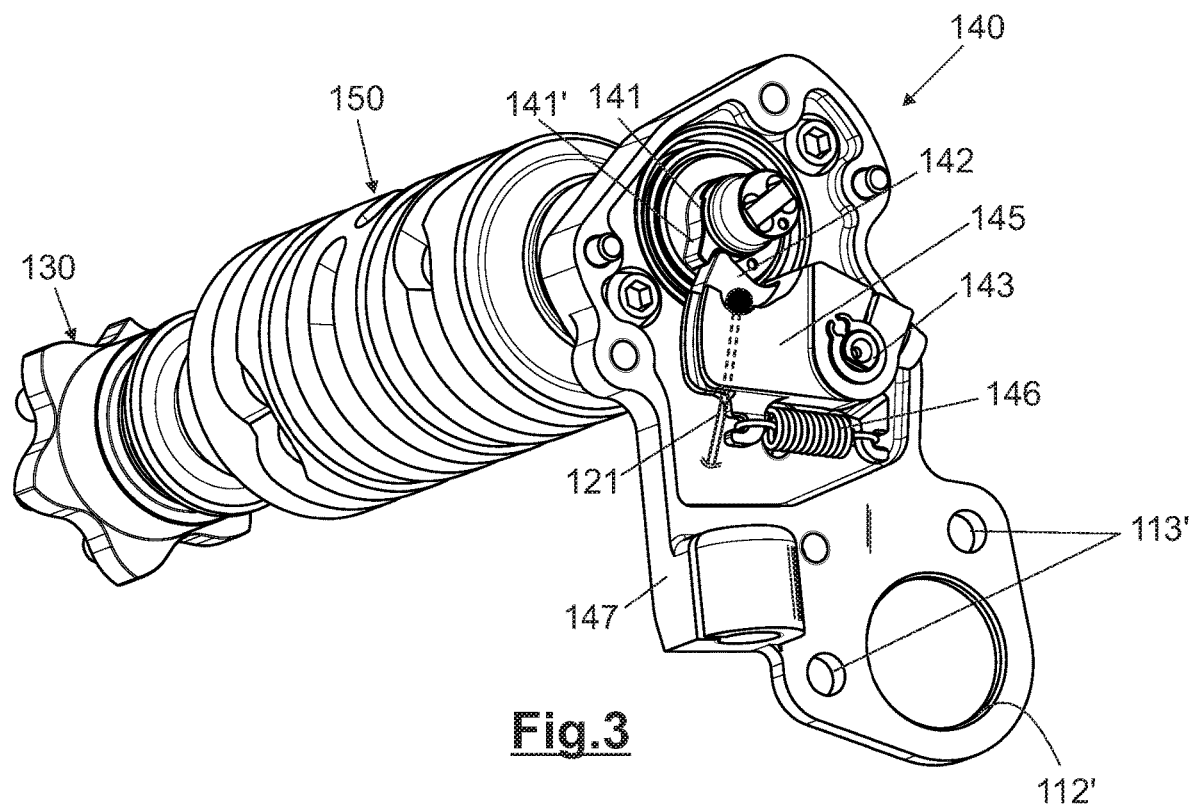
FIG. 3 is a cross side view of FIG. 1, where the block device is shown in detail.

With reference to FIGS. 1 and 2, a gear shift 100 is shown of a saddle vehicle, here below referred to as motorbike, M. The gear shift 100 comprises a shift lever 110 controlling the rotation of a selecting element 130.

In particular, a ratchet gear 135 is provided, controlled through the shift lever 110. The selecting element 130 is controlled through the ratchet gear 135 and allows rotation by angular sectors in order to engage gears.

As shown in FIG. 2, the shift lever 110 controls the ratchet gear 135 through a shaft 111.

The selecting element 130 is keyed onto a selector drum, or desmodromic drum, 150. As well known, the rotation of the selecting element 130 corresponds to a rotation of the desmodromic drum 150, that, in turn, causes the shifting of forks (not shown) that are controlled by the tracks 151 provided on the desmodromic drum 150 and that combine the gearset differently so as to engage the corresponding gear.

Figure 5:
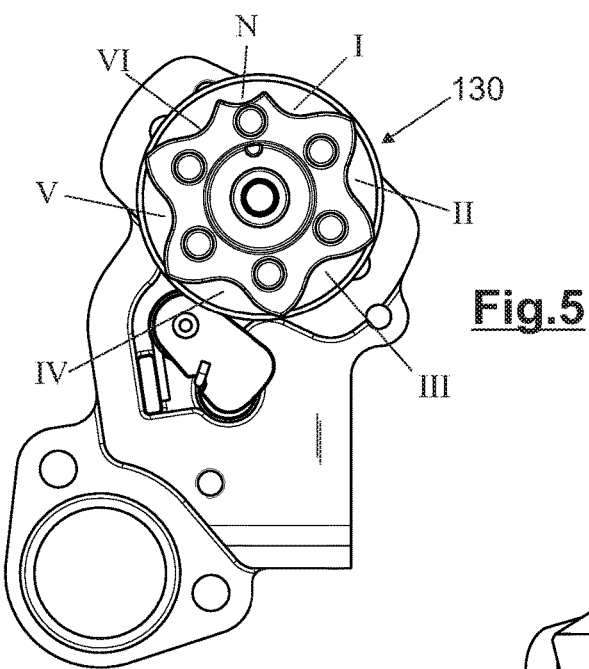
FIG. 5 is a side view of the selecting element of the gear shift of the invention.

The selecting element 130 is star-shaped with a plurality of hollows 131 interrupted by a plurality of crests 132 corresponding to a respective gear, i.e. first gear I, second gear II, third gear III, fourth gear IV, fifth gear V and sixth gear VI, as well as a neutral gear N as better shown in FIG. 5. Obviously, the number of gears changes based on the type of motorbike.

The angular sector of each gear is defined by a respective hollow 131 in the selecting element 130. Changing a gear consists therefore in overcoming a crest 132 up to the following hollow.

The gear shift 100 provides for sequentially engaging gears, through the shift lever 110, with only one change direction Up starting from a neutral gear N. In particular, it provides for changing up gears from the neutral gear N by moving the shift lever 110 always upwards, i.e. with a movement Up. Vice versa, it provides for changing down gears by moving the shift lever 110 always downwards, i.e. with a movement Dwn. The neutral gear N is provided in the first angular sector of the selecting element 130 and defines, therefore, a starting position.

Figure 4:
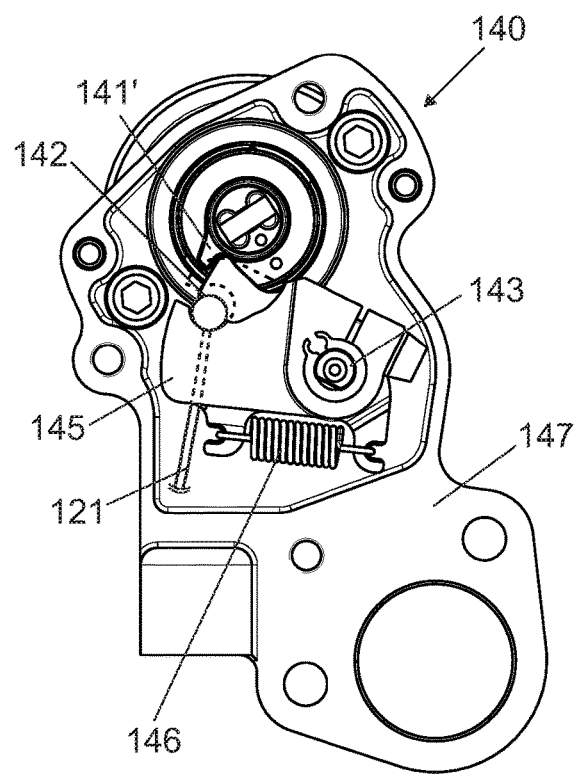
FIG. 4 is a side view of the block device of FIG. 3 in a portion of a component of the control means has been indicated in broken line to show better the position of a block element.
Figure 8:
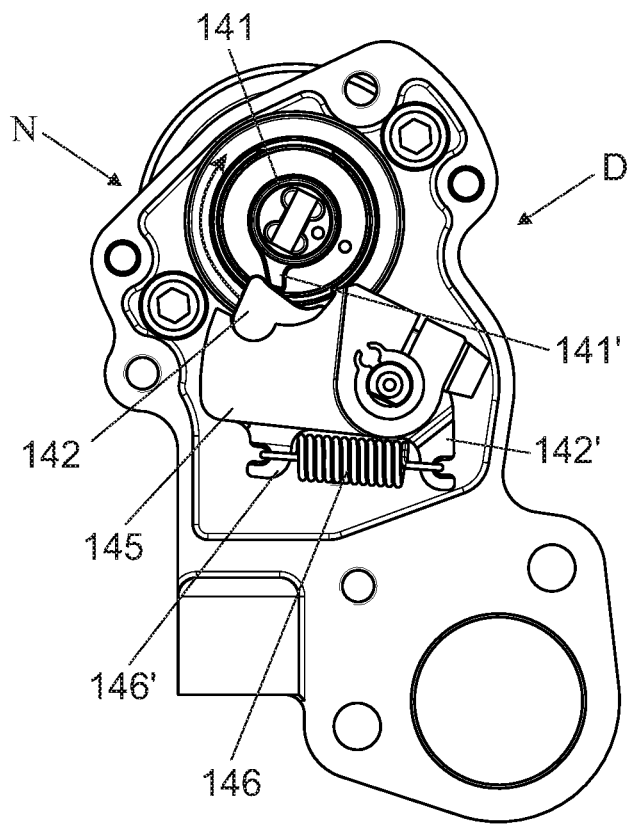
FIG. 8 is a side view of the block device in the position, where the neutral gear is engaged.
Figure 9:
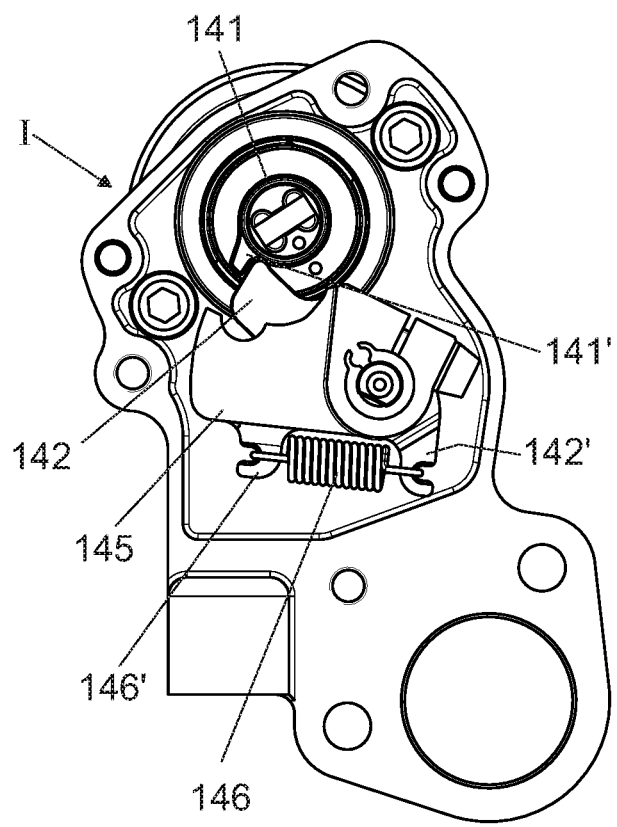
FIG. 9 is a side view of the block device in the position, where the first gear is engaged.
Figure 10:
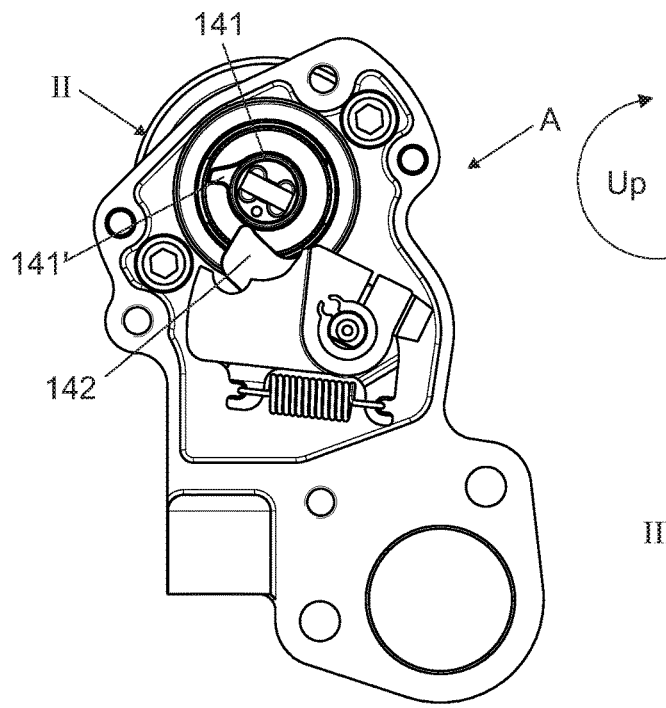
FIGS. 10 to 14 are side views of the block device, where the abutment element is rotated into a position where the gears are engaged; these figures show the sequence of the gears, from the second one to the sixth one.
Figure 11:
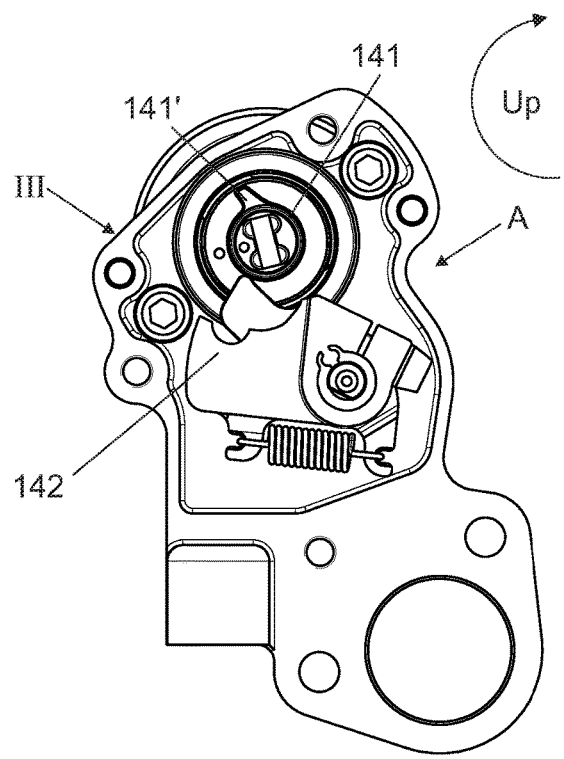
Figure 12:
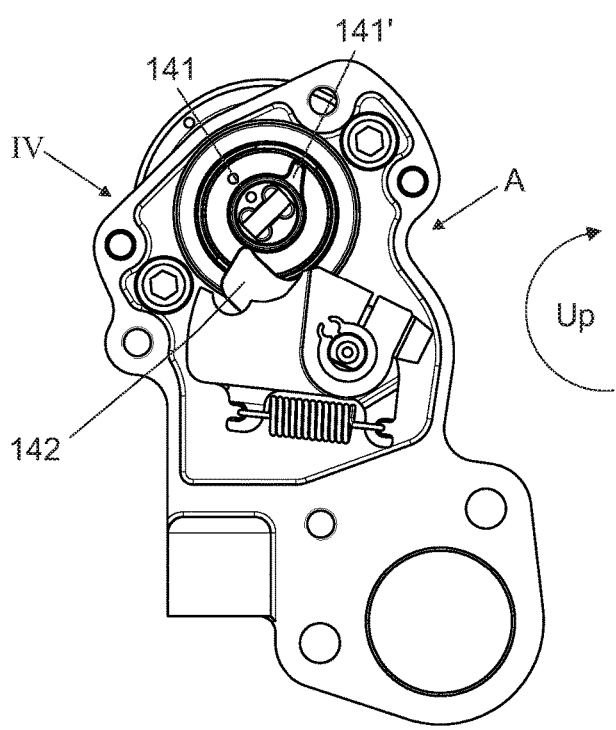
Figure 13:
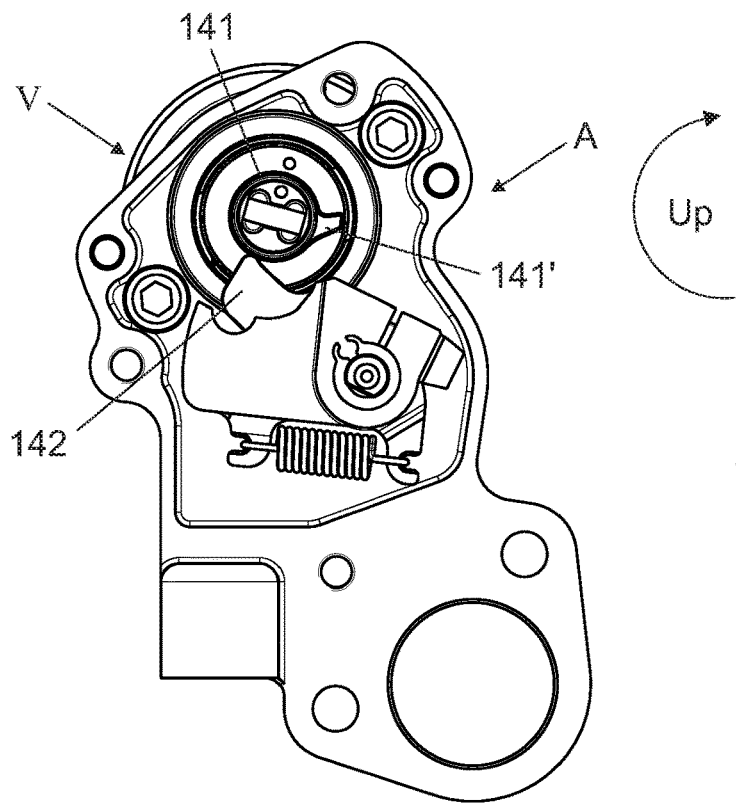
Figure 14:
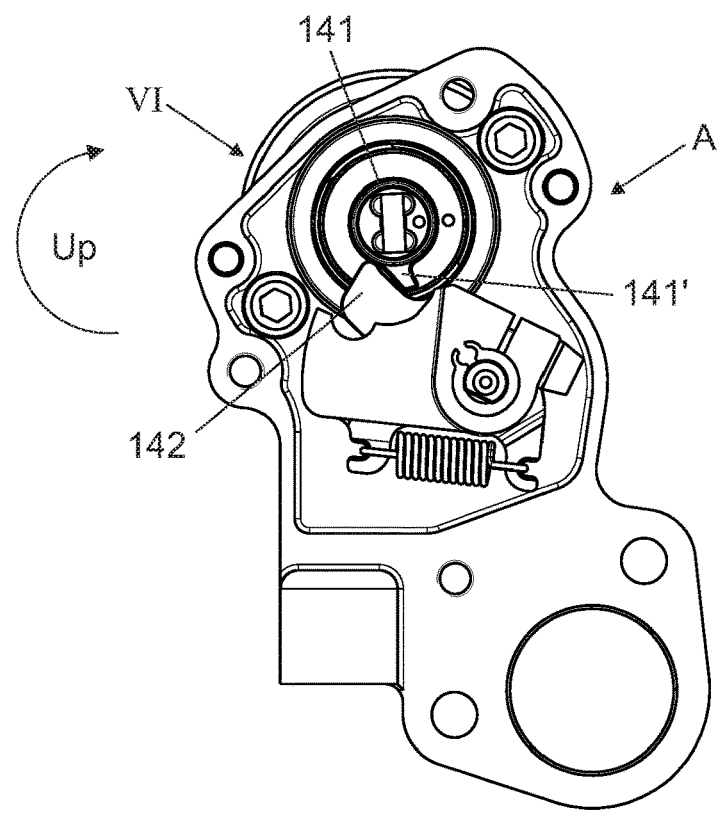

The gear shift further comprises a block device 140 functionally connected to the selector drum 150 (FIG. 2). The block device 140 is configured so as to be switched between a first configuration, wherein it allows engaging a first gear I from a neutral gear N in a first change direction Up (FIG. 8), and a second configuration, wherein it inhibits the subsequent engagement of the neutral gear N from the first gear I in a second change direction Dwn (FIG. 9 or 4).

In other words, the block device 140 allows engaging the first gear I from a neutral gear N and, once the first gear has been engaged, i.e. once the motorbike is moving it inhibits engaging the neutral gear N during the vehicle motion.

Figure 1A:
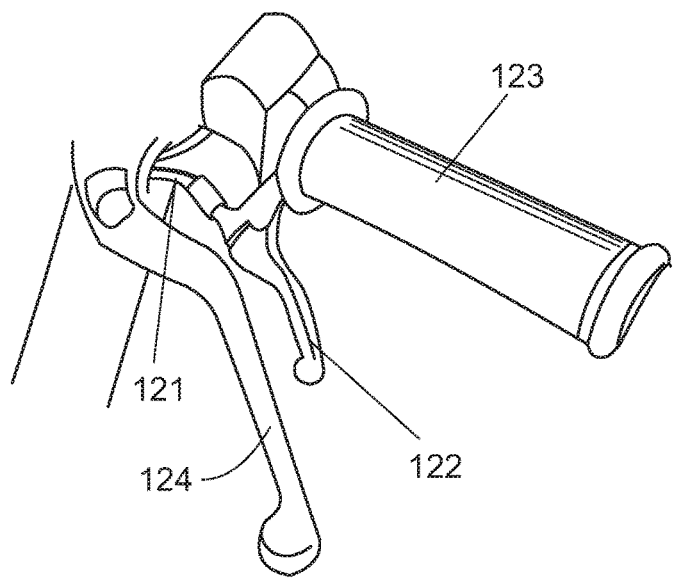
Figure 15:
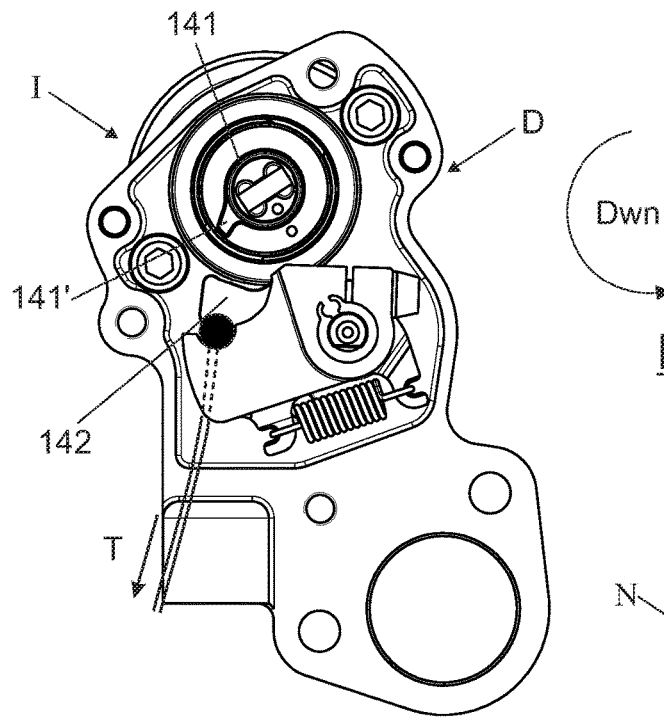
FIG. 15 is a side view of the block device in disabled configuration, obtained through control means controlled by the rider; in this figure the first gear is engaged.

Control means 120 of block device 140 are also provided, remotely actuated by the rider G for instance through a control 122 on the handlebar 123, in particular at the side of the clutch lever 124 (FIG. 1A). When the control means are actuated, the block device 140 takes a third configuration (FIGS. 15 and 6), wherein the block device 140 is disabled in order to allow engaging again the neutral gear N from the first gear I in the second change direction Dwn.

From a constructive viewpoint, the block device 140 is mounted on a support plate 147 keyed on the desmodromic drum 150. On the same support plate there is also provided the shift lever 110, mounted in a seat 112' and fastened through fastening screws 113 screwed in the holes 113'. The shaft 111 extends from the seat 122 and is connected to the ratchet gear 135.

In particular, the block device 140 comprises a stop element 141,141', mounted integral with the selector drum 150, and a block element 142, co-acting with the stop element 141,141'.

The stop element is a bushing 141 comprising a tooth-shaped portion 141'. The bushing 141 is inserted on the shaft of the selector drum 150.

Figure 16:
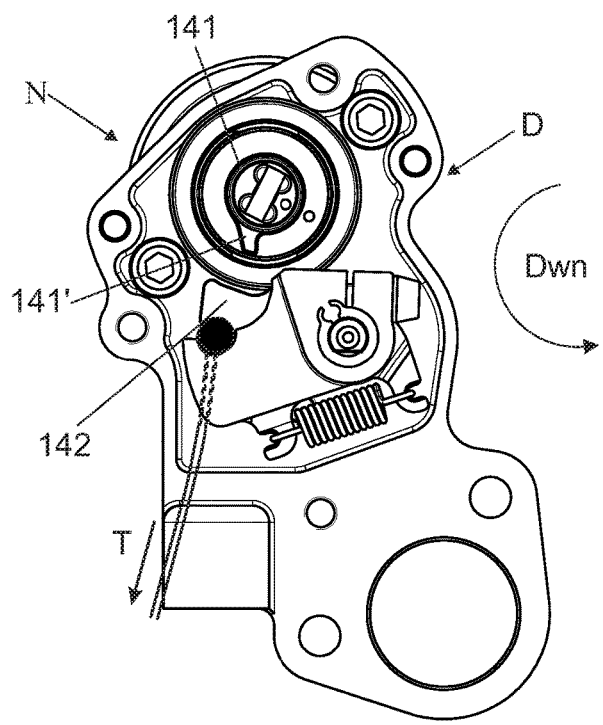
FIG. 16 is a side view of the block device in the disabled configuration of FIG. 15, where the neutral gear is engaged by disabling the block device.
Figure 17:
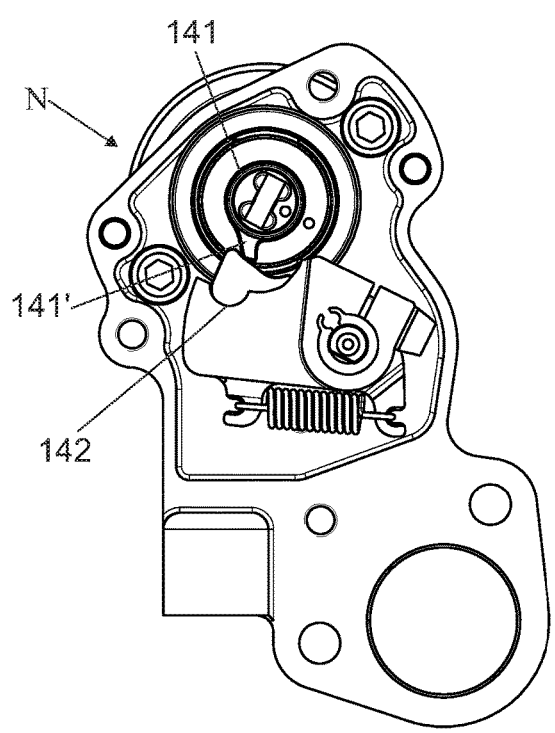
FIG. 17 is a side view of the block device in the configuration, where the neutral gear is engaged, similarly to the configuration of FIG. 8.

The block element 142 is adapted to switch in the first configuration (FIG. 8), in which the block element 142 is fastened to the stop element 141,141' allowing rotation in the first change direction for engaging the first gear I from the neutral gear N. Conversely, in the second configuration the block element 142 is enabled and contrasts the stop element 141,141' inhibiting the engagement of the neutral gear N from the first gear I in the second change direction Dwn (FIGS. 4 and 9). Furthermore, in the third configuration (FIGS. 15 and 16), by means of the control means 120 the block element 142 is spaced from the stop element 141, 141' allowing to engage again the neutral gear N from the first gear I.

In particular, the block element 142 is rotatably connected around a rotation axis X-X thereof, and is advantageously mounted on the support plate 147. The block element 142 comprises a first elastic element 146. The first elastic element 146 allows abutting the block element 142 against the stop element 141,141'.

In this way, the block element 142 can take three different configurations.

In a first configuration, corresponding to the neutral gear N (FIG. 8), the block element 142 is fastened to the tooth-shaped portion 141' of the stop element 141, i.e. there is a corner contact with the tooth-shaped portion 114'. This configuration allows the selector drum to rotate in the first change direction Up when the first gear I is engaged.

In more detail, the contact is, in this case, a friction corner contact. In fact, in this position the rider G, moving the shift lever 110 upwards for engaging the first gear I, controls the rotation of the selecting element 130 by a given angular sector. The rotation of the desmodromic drum 150 causes the rotation of the tooth-shaped portion 141', that slides for a given segment on the block element 142 and leaves the corner contact position to achieve the first gear I.

Once the first gear I has been engaged, the block element 142, pushed by the first elastic element 146, moves farther up to touch the surface of the bushing 141 (FIG. 4). In fact, the elastic element acts on the block element 142 allowing it to touch permanently the stop element 141,141'.

The engagement of the first gear I defines an enabled configuration A of the block element 142 on the stop element 141,141'. In this way, the block device 142 is enabled whenever the first gear I is engaged from the neutral gear N through the first elastic element 146 that triggers the block element 142 and makes it rotate up to abut again against the surface of the bushing 141 of the stop element 141'.

Therefore, in the enabled configuration A, when the first gear I is engaged, the block element 142 laterally touches the tooth-shaped portion 141' and consequently prevents the neutral gear N from being engaged again and thus the desmodromic drum 150 from rotating starting from the first gear I in the second change direction Dwn.

In this position, the rider G can engage again the neutral gear N only by releasing the block element 142, as explained below.

The enabled block element 142 allows the rider regularly to engage all gears, but it inhibits the engagement of the neutral gear when changing down.

In fact, starting from the first gear I in the first change direction Up the tooth-shaped portion 141' relatively rotates (FIGS. 10 to 14) up to achieve the position of sixth gear, where it touches the block element 142 at the opposite side. In the opposite change direction Dwn, the tooth-shaped portion 141' rotates again towards the block element up to be fastened thereto in the position of first gear I.

In order to engage the neutral gear N again, the rider shall thus disable the block element 142 through the control means 120.

In particular, the control means comprise the above-mentioned actuating element 122, in particular a lever controlled by the rider G and provided on the handlebar 123 of the saddle vehicle (FIG. 1A).

Alternatively, even if not shown in the figures, a button can be provided transmitting an actuation signal to an actuator controlling the block element 142.

The lever 122 is connected to the block element 142 through a cable 121. The traction T of the cable 121 causes the rotation of the block element 142 and the disabling D thereof in order to engage the neutral gear N again.

Figure 6:
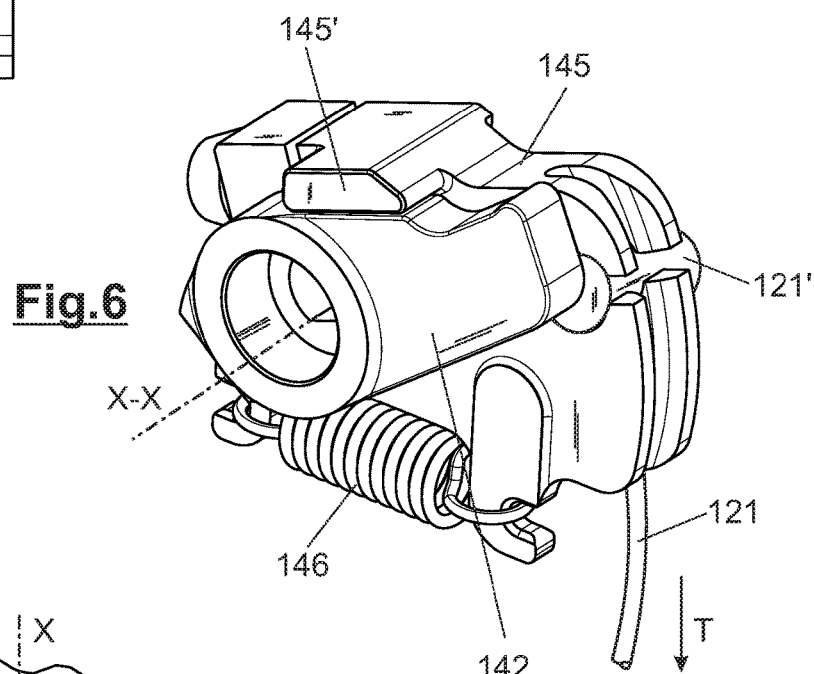
FIG. 6 is a perspective view of the block element and of the control element connected together through a return element.
Figure 7:
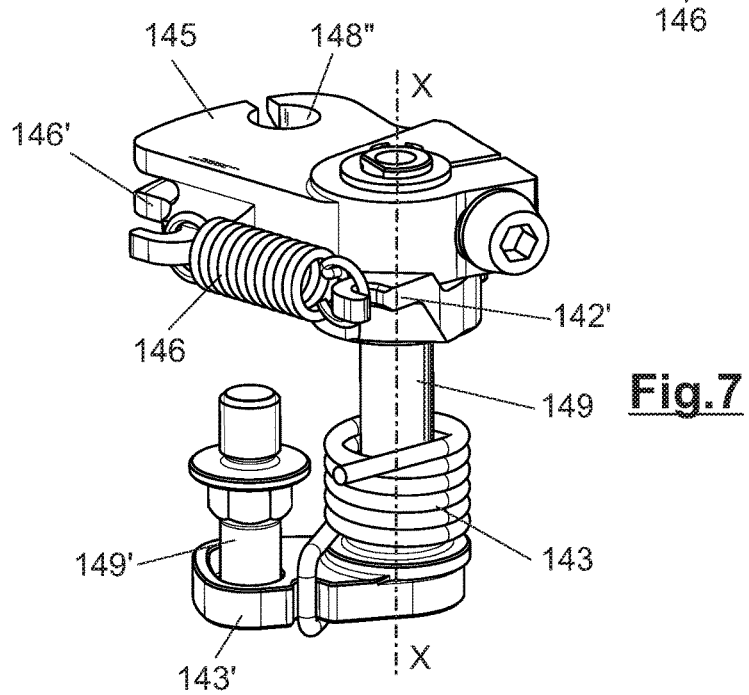
FIG. 7 is an alternative perspective view of FIG. 6, showing a second return element configured to bring again the control component into position.

In a preferred embodiment, the block element 142 is associated with a control element 145, as better shown in FIGS. 6 and 7.

The control element 145 is rotatably connected to the block element 142 coaxially with the rotation axis X-X on the support plate 147 (FIG. 2).

Both the block element 142 and the control element 145 are mounted on a shaft 149 defining the axis X-X (FIG. 7). The control element 145 is mounted overlapping the block element 142. A second elastic element 143, in particular a torsional spring 143, is provided on the shaft 149. The spring is rotatably blocked around a portion 143' fastened to the support plate 147 through a pin 149'.

The block element 142 comprises, at a side, a first hook-shaped portion 142'. The control element 145 comprises, at the opposite side, a second hook-shaped portion 146'. The spring 146, constituting the first elastic member, is provided between the two hook-shaped portions 142' and 146'.

The first elastic element 146 therefore connects the control element 145 and the block element 142, so as to generate an elastic force pushing the block element 142 against the stop element 141, keeping it in position.

The control element 145 comprises a seat 148" where a stop 121' is provided for the connection with the traction cable 121 (FIG. 6).

In particular, the control element 145 comprises an abutment portion 145', to which the block element 142 is fastened. The abutment portion 145' is adapted to draw the block element 142 when the traction cable 121 is actuated through the lever 122. The traction of the cable overcomes the elastic force of the spring 143 and relatively rotates the control element 145 that draws, through the abutment 14', the block element 142.

In this phase, the third configuration is provided, wherein the block element 142 is spaced from the tooth-shaped portion 141', allowing the selector drum 150 to rotate to engage again the neutral gear (N) from the first gear (I) in the second change direction (Dwn) and to return to the first configuration.

Once the neutral gear has been engaged again, the torsional spring 143 brings the control element 145 and the block element 142 again in position.

The block device 140 is preferably mounted outside the shift assembly, in particular at the opposite side of the selecting element. In this way, it is possible to mount the selecting element with no additional operation on the shift assembly.

The above description of specific embodiments illustrates the invention from a conceptual viewpoint, so that other people, using the known technique, can modify and/or adapt these specific embodiments in various applications without further researches and without departing from the inventive concept; therefore, it is intended that such adaptations and modifications shall be considered as equivalent to these specific embodiments. The various functions described herein can be embodied through means and materials of various kind, without however departing from the protective scope of the invention. It should be understood that the expressions and terminology used have only descriptive and thus not-exclusive purpose.

The invention claimed is:

1. A gear shift of a saddle vehicle, the gear shift comprising:
   a shift lever;
   a selecting element actuated through the shift lever;
   a selector drum connected to the selecting element and adapted to engage gears;
   a block device functionally connected to the selector drum and configured to be switched between:
      a first configuration, wherein the block device allows engaging a first gear from a neutral gear in a first change direction of the selector drum, and
      a second configuration, wherein the block device inhibits subsequent engagement of the neutral gear from the first gear in a second change direction of the selector drum;
   a control means of the block device capable of actuation by a rider so as to define a third configuration, wherein the block device is disabled in order to allow engaging the neutral gear from the first gear in the second change direction, wherein the block device comprises:
      a stop element constituted by a bushing comprising a tooth-shaped portion, mounted integral with the selector drum; and
      a block element co-acting with the stop element and adapted to switch between the first configuration, the second configuration and the third configuration, wherein the block element is mounted rotatable around a rotation axis and the block element comprises a first elastic element so as to take:
         the first configuration, wherein the block element is fastened to the tooth-shaped portion, corresponding to the neutral gear, allowing the selector drum to rotate in the first change direction to engage the first gear and subsequent gears;
         the second configuration, wherein the block element is adjacent to, and touching, the tooth-shaped portion, corresponding to the first gear, preventing the selector drum from rotating in the second change direction to engage again the neutral gear from the first gear;
         the third configuration, wherein the block element is spaced from the tooth-shaped portion through the control means, allowing the selector drum to rotate in the second change direction to engage again the neutral gear from the first gear and to return to the first configuration.

2. The gear shift of claim 1, wherein the selecting element is configured to provide for a changing up of gears starting from the neutral gear to a gear by actuating the shift lever in a single first change direction, and for a changing down of gears starting from the gear to the neutral gear in a single second change direction opposite to the first change direction.

3. The gear shift of claim 1, wherein the control means comprises:
   an actuating element controlled by a rider;
   a connecting means for connecting the actuating element and the block element.

4. The gear shift of claim 3, wherein the actuating element is a lever provided on a handlebar of the saddle vehicle and the connecting means comprises an actuation cable connecting the lever to the block element.

5. The gear shift of claim 4, wherein a control element is provided, actuated by means of the connecting means and connected to the block element, the control element being configured as to move the block element between the second configuration and the third configuration in order to return to the first configuration.

6. The gear shift of claim 5, wherein the control element is rotatably connected to the block element around a rotation axis, and wherein the first elastic element connects the control element to the block element, the first elastic element being adapted to generate an elastic force pushing the block element against the stop element, keeping the block element in position.

7. The gear shift of claim 6, wherein the control element comprises an abutment portion, wherein the abutment portion is adapted to draw the block element to the third configuration when the control means is actuated, and wherein the control element comprises a second elastic element adapted to bring again the control element into position when the control means is disabled.

8. The gear shift of claim 7, wherein the second elastic element is a torsional spring.

9. A saddle vehicle comprising:
   a gear shift comprising:
      a shift lever;
      a selecting element actuated through the shift lever;
      a selector drum connected to the selecting element and adapted to engage gears;
      a block device functionally connected to the selector drum and configured to be switched between:

a first configuration, wherein the block device allows engaging a first gear from a neutral gear in a first change direction of the selector drum, and a second configuration, wherein the block device inhibits subsequent engagement of the neutral gear from the first gear in a second change direction of the selector drum;

a control means of the block device capable of actuation by a rider so as to define a third configuration, wherein the block device is disabled in order to allow engaging the neutral gear from the first gear in the second change direction, wherein the block device comprises:

a stop element constituted by a bushing comprising a tooth-shaped portion, mounted integral with the selector drum; and a block element co-acting with the stop element and adapted to switch between the first configuration, the second configuration and the third configuration, wherein the block element is mounted rotatable around a rotation axis and the block element comprises a first elastic element so as to take:

the first configuration, wherein the block element is fastened to the tooth-shaped portion, corresponding to the neutral gear, allowing the selector drum to rotate in the first change direction to engage the first gear and subsequent gears;

the second configuration, wherein the block element is adjacent to, and touching, the tooth-shaped portion, corresponding to the first gear, preventing the selector drum from rotating in the second change direction to engage again the neutral gear from the first gear;

the third configuration, wherein the block element is spaced from the tooth-shaped portion through the control means, allowing the selector drum to rotate in the second change direction to engage again the neutral gear from the first gear and to return to the first configuration.

\* \* \* \* \*